Jan. 6, 1925.

W. M. MURPHY

COMBINED TIRE PUMP AND AUTO JACK

Filed July 25, 1924

W. M. Murphy
INVENTOR

BY Victor J. Evans
ATTORNEY

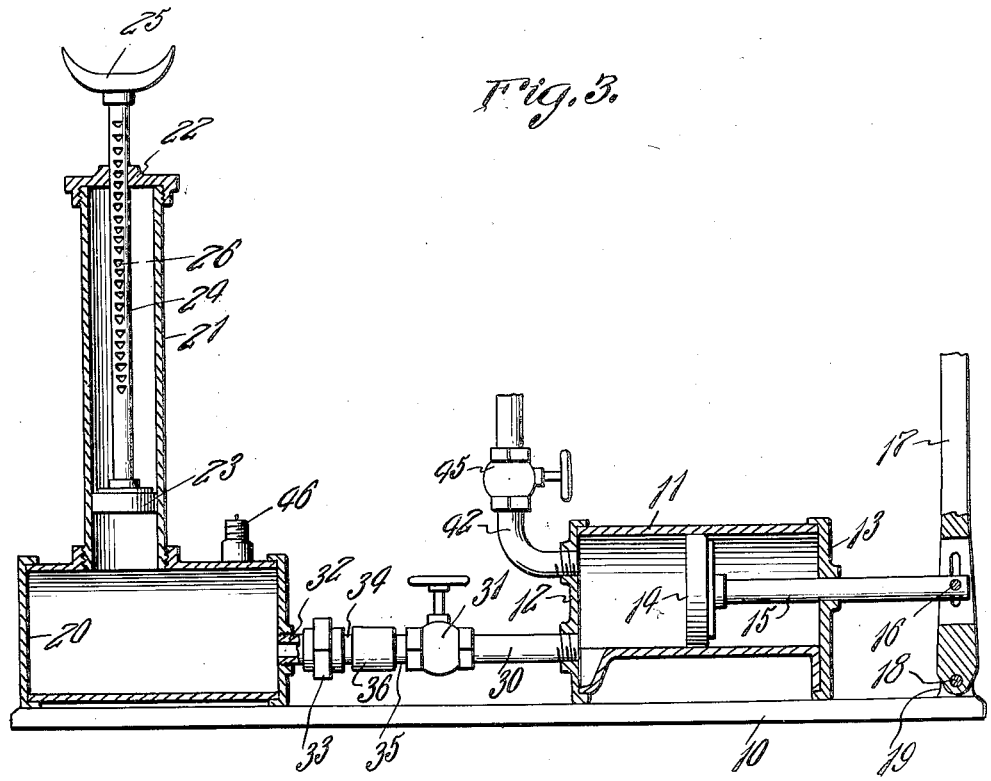
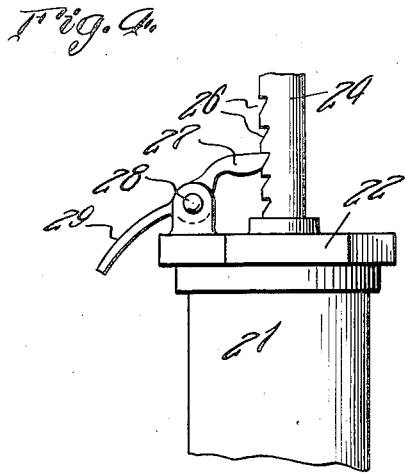
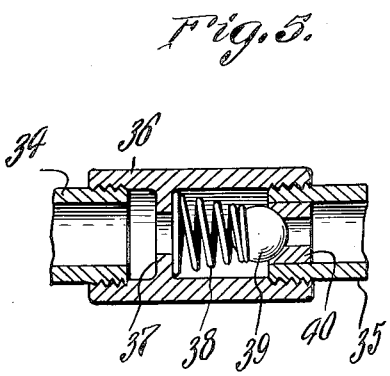

Patented Jan. 6, 1925.

1,522,381

UNITED STATES PATENT OFFICE.

WILEY M. MURPHY, OF NORTON, VIRGINIA.

COMBINED TIRE PUMP AND AUTO JACK.

Application filed July 25, 1924. Serial No. 728,243.

*To all whom it may concern:*

Be it known that I, WILEY M. MURPHY, a citizen of the United States, residing at Norton, in the county of Wise and State of Virginia, have invented new and useful Improvements in Combined Tire Pumps and Auto Jacks, of which the following is a specification.

This invention relates to accessories for use in connection with motor vehicles and has for its object the provision of a combined tire pump and jack, the jack being operated by compressed air supplied either from the pump or from an external source of supply.

An important object is the provision of a device of this character which will be simple and inexpensive in manufacture, easy to operate, convenient to use, efficient and durable in service, and a general improvement in the art.

With the above and other objects and advantages in view, the invention consists in the details of construction and arrangement of parts to be hereinafter more fully described and claimed, and illustrated in the accompanying drawings, in which:—

Figure 3 is a longitudinal section.

Figure 4 is a fragmentary detail view showing the catch means for the jack.

Figure 5 is a detail section through the check valve.

Figure 1:
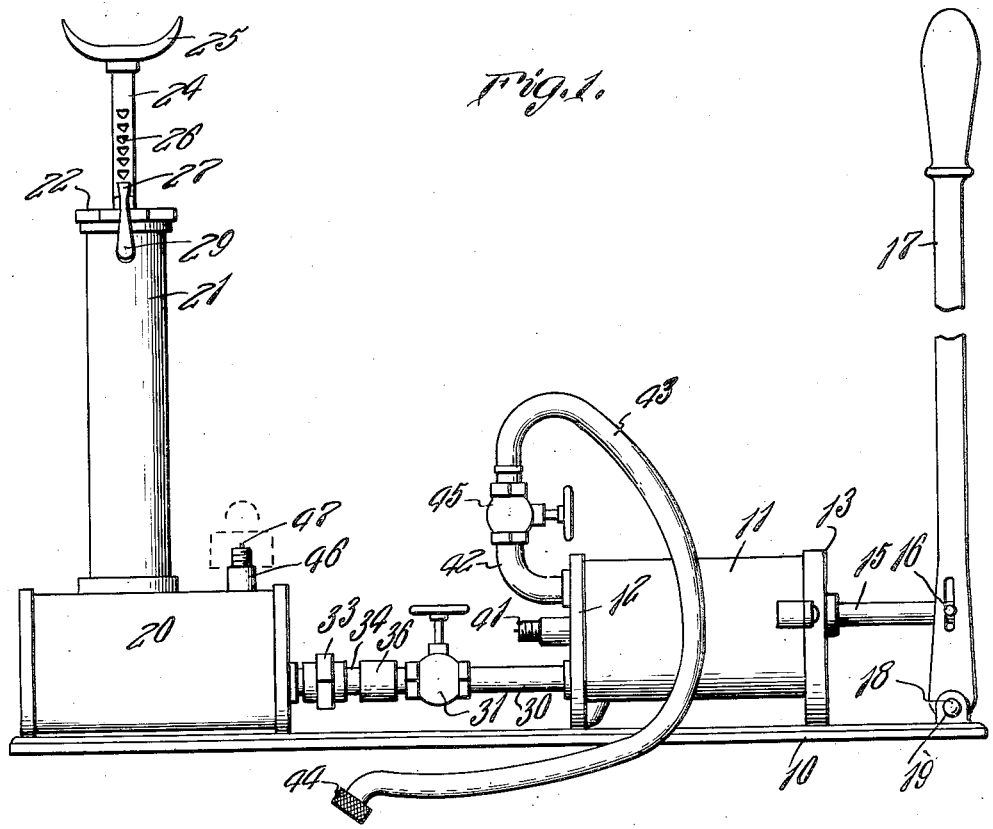
Figure 1 is a side elevation of the complete device.
Figure 2:
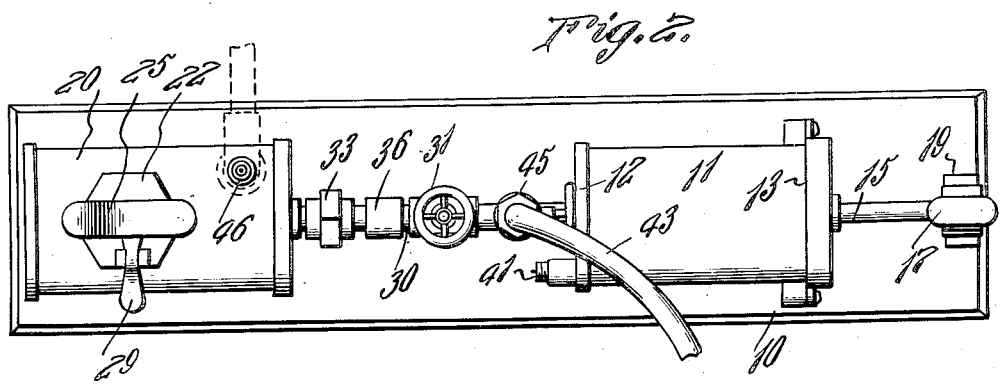
Figure 2 is a top plan view thereof.

Referring more particularly to the drawings, the numeral 10 designates a suitable base on which is mounted a horizontally disposed pump cylinder 11 comprising the usual cylindrical body equipped at its ends with heads 12 and 13. Operating within the pump cylinder is a conventional pistion 14 carried by a piston rod 15 slidable through the head 13 and pivotally connected at 16 with an outstanding operating lever 17 pivoted at 18 on ears 19 rising from the base.

Mounted upon the other end of the base is a casing 20 from the top of which rises a cylinder 21 closed at its upper end by a cap 22 and containing a piston 23 at the lower end of a shank 24 slidable through the cap 22 and carrying a yoke or saddle 25 adapted for engagement with the axle of a vehicle. Throughout its length, the shank 24 is provided with notches 26 co-operating with a pawl 27 pivoted at 28 on the cap 22 and terminating in a handle 29 by means of which the pawl may be released from engagement with the notches, or any notch.

Connected and communicating with the inner end of the cylinder 11, or in other words, connected with the head 12 is a pipe 30 within which is interposed a cut-off valve 31. Leading from the adjacent end of the casing 20 is a pipe 32 carrying a union 23 from which extends or which is connected with a short section of pipe 34. A similar section 35 is connected with the valve 31. At this point I provide a check valve which includes a body 36 screwed upon the sections 34 and 35 and formed internally with a flange 37 constituting an abutment for one end of a spring 38 which bears against a ball 39 which is provided for co-operation with a seat 40 within the pipe section 35. The purpose of this check valve is to prevent back pressure through the pipes 35 and 30 when the pump is operated.

The head 12 also carries an air inlet valve 41 and also an outlet pipe 42 with which is connected a flexible hose 43 carrying the usual terminal member 44 so constructed as to be engageable upon the inflation valve of a tire. A valve 45 is interposed in the pipe 42. The top of the casing 20 is provided with a release valve 46 upon which the terminal member 44 may be engaged for a purpose to be described.

In the operation, when it is desired to pump up a tire, the valve 31 is closed and the valve 45 is opened. The terminal member 44 is engaged upon the valve stem of the tire to be inflated and the lever 17 is then moved back and forth to reciprocate the piston 14. Air will naturally be compressed and will pass out through the pipe 42 and hose 43 to the tire.

If it is desired to jack up a wheel, the saddle member 25 is engaged beneath the axle or other desired point. The valve 45 is then closed and the valve 31 is opened. When the lever 17 is then moved back and forth the air compressed by the piston 14 will pass into the casing 20 and acting against the piston 23 will force the shank 24 upwardly, thus elevating the wheel. The weight is sustained by the pawl 27 co-operating with the notches 26, to release the pressure within the casing 20 and permit lowering of the jack, the terminal member 44 may be pressed on the protruding stake 47 of the relief valve 46. The details of construction of the air inlet valve 41 and relief valve 46 are not disclosed for the reason that they are identical in construction with the tire valve which are well known.

If by chance the vehicle with which the device is used should be equipped with a motor driven pump, it will be unnecessary of course to use the pump feature of my device and the outlet hose of such air compresser or pump may be engaged upon the valve 46 as shown by dotted lines in Figure 1 in order to operate the jack, it being obvious that the valve 31 must be closed at such a time While I have shown and described the preferred embodiment of the invention, it should be understood that I reserve the right to make such changes in the form, construction and arrangement of parts as will not depart from the spirit of the invention or the scope of the sub-joined claims.

Having described my invention, what I claim is:—

1. A device of the character described comprising a pump having a valved outlet, a casing having valved connection with the pump, a cylinder rising from and communicating with the interior of the casing, a piston within said cylinder, a shank carried by the piston, and a saddle member on the upper end of the shank.

2. A device of the character described comprising a pump having a valved outlet, a casing having valved connection with the pump, a cylinder rising from and communicating with the interior of the casing, a piston within said cylinder, a shank carried by the piston, and a saddle member on the upper end of the shank; said shank being provided throughout its length with a series of notches, and a pawl pivoted on the upper end of the cylinder and co-operating with said notches.

3. A device of the character described comprising a pump having a valved outlet, a casing having valved connection with the pump, a cylinder rising from and communicating with the interior of the casing, a piston within said cylinder, a shank carried by the piston, and a saddle member on the upper end of the shank, and a relief valve on the casing for permitting exhaust of compressed air therefrom and adapted to be engaged by the terminal member of a compressed air hose for moving the piston and shank independently of said pump.

In testimony whereof I affix my signature.

WILEY M. MURPHY.